No. 781,945. PATENTED FEB. 7, 1905.
E. S. HALSEY.
ELECTRIC METER.
APPLICATION FILED MAR. 13, 1902.

Witnesses:
Geo. C. Davison.
E. Bert Smith.

Inventor:
Edward S. Halsey.

No. 781,945. Patented February 7, 1905.

UNITED STATES PATENT OFFICE.

EDWARD S. HALSEY, OF CHICAGO, ILLINOIS, ASSIGNOR TO GENERAL ELECTRIC COMPANY, A CORPORATION OF NEW YORK.

ELECTRIC METER.

SPECIFICATION forming part of Letters Patent No. 781,945, dated February 7, 1905.

Application filed March 13, 1902. Serial No. 97,984.

*To all whom it may concern:*

Be it known that I, EDWARD S. HALSEY, a citizen of the United States of America, residing in Chicago, county of Cook, and State of Illinois, have invented new and useful Improvements in Electric Meters, of which the following is a specification.

My invention relates to an electric measuring instrument for measuring the energy or a factor of the energy consumed in an electric circuit or branch circuit.

More particularly, my invention relates to an integrating electric meter of the type shown in my Patents Nos. 626,833 and 664,265, having an integrating mechanism driven by a motor consisting of an electric conductor immersed in a conducting fluid and mounted for rotation in a magnetic field. The current to be measured or a definite portion thereof is led to the conductor, which in this case is a metallic disk, by the conducting fluid in which it is immersed, and the torque of the disk is directly proportional to this current. The rotation of the disk is retarded by the braking-effect of Foucault currents generated in the disk when it is rotated in the magnetic field.

The objects of my present invention are to provide a convenient and efficient device for adjusting the speed of the meter, to decrease the effect of temperature changes on the Foucault braking device, to increase the conductivity of the disk for Foucault currents without increasing the gap of the magnet or magnets, and to provide means for compensating for the deterring influence of fluid friction.

The novel features of the invention will be definitely indicated in the claims appended hereto.

The details of construction and the mode of operation of the meter will be better understood by reference to the following description, taken in connection with the accompanying drawings, which illustrate one embodiment of my invention, and in which—

Figure 1:
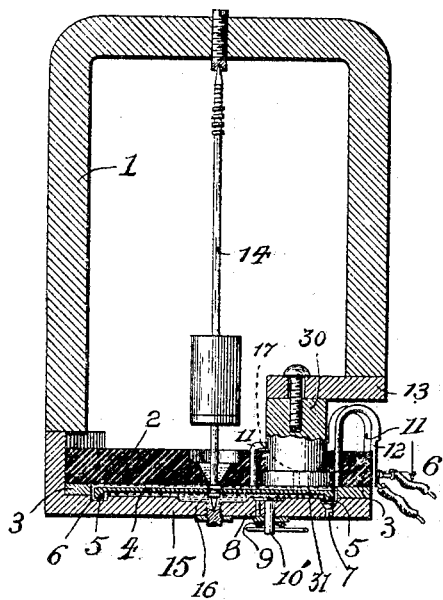
Figure 2:
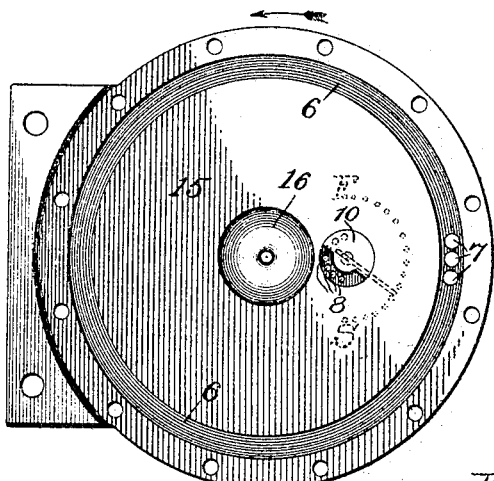
Figure 3:
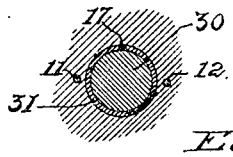

Figure 1 is a vertical section through the center of the magnet and receptacle. Fig. 2 is a plan view of the bottom of the mercury-receptacle, which also serves as a pole-piece; and Fig. 3 is a section on the line 6 of Fig. 1.

Referring to the drawings, 1 indicates a permanent magnet, to one pole of which is secured a flat circular pole-piece 15, of cast or wrought iron, having a central opening therein to receive a step-bearing for shaft 14 and a concentric depression 16 in its upper face about the opening. A disk 2, of fiber or other insulating material, is mounted on the disk 15, but separated therefrom by a washer 3, so as to form a thin flat receptacle, in which the armature-disk 4, mounted on the spindle 14, rotates in a bath of mercury. Connected to the other pole of the magnet 1 by a stamping 13, preferably of wrought-iron, is a cylindrical concentrated pole-piece 30, which extends down through an opening in the disk 2 to the top of the mercury-receptacle. Current is led to the disk-armature by the mercury and the amalgamated conductors 11 and 12, which enter the mercury-receptacle. Encircling the end of the pole-piece 30 is a ring 31, of metal of good conductivity, constituting a stationary return-path for Foucault currents generated in the disk-armature. If desired, this ring may be mounted on the pole-piece by a threaded connection, so as to be adjustable thereon, as shown in my Patent No. 664,265 above referred to. A more detailed description of these parts of the meter is considered unnecessary, as they form no part of my present invention.

In addition to the stationary return for Foucault currents above the armature 4 through the ring 31 I provide another return-path below the armature through that portion of the iron disk 15 which lies beneath the upper pole-piece 30. To decrease the resistance of this path, I provide two series of amalgamated copper or alloy plugs 7 and 8, tightly riveted into holes drilled in disk 15 and located opposite the points of extreme difference of potential in the Foucault-current circuit. The plugs 7 are preferably three in number and are located at the outer edge of the mercury-receptacle. They are of larger diameter than the plugs 8 of the inner set, which are seven in number, and are arranged in a semicircle in a shallow circular depression in the upper face of disk 15. At the center of this depression is a stem 10', extending down through an opening in disk 15 and carrying at its upper end a thin semicircular iron shutter 10. This shutter lies in the depression in disk 15 and is adapted to be moved around to cover one or more of the plugs 8. On the lower end of the stem is a fiber gasket held in place by a spring-steel washer 9 to make the opening in disk 15 mercury-tight, washer 9 being retained under pressure by a pin driven through a hole in the lower end of the stem. This pin serves as a pointer or index with relation to a semicircular scale on the bottom side of disk 15, as shown in dotted lines in Fig. 2. Letters "F" and "S", also shown in dotted lines, indicate "Fast" and "Slow", and by turning the pointer to "F" the shutter 10 will cover all the plugs 8, thus cutting off this stationary return-circuit for the Foucault currents almost entirely and making the meter run faster. By turning the pointer toward "S" one or more of the plugs 8 will be exposed and the speed of the meter decreased.

The conductivity of all common metals at ordinary temperatures, when commercially pure and unalloyed, varies greatly with variations in temperature. Heretofore the practice among meter manufacturers has been to use closed drag-circuits or brake-disks of purest commercial copper or aluminium in order to obtain the highest possible conductivity and consequent maximum drag effect, aluminium being used when a maximum drag with a minimum of weight is desired and copper when a maximum drag with a minimum of thickness of the disk is desired. After considerable investigation and experiment I have determined that it is practicable to materially reduce the temperature coefficient of the brake-disk by employing instead of pure metal an alloy properly proportioned to produce a conductor with a temperature coefficient much less than that of commercially-pure metal, although with some loss of specific conductivity. The total conductivity desired may be attained by proper design and proportion, or means such as are shown herein may be resorted to in order to offset this loss of conductivity. The alloy which I prefer to use for this purpose and with which I have most successfully accomplished this end is an alloy of ninety-eight per cent. or more of pure copper with the balance of chromium and tungsten in the proportion of about three of the former to one of the latter. By this means I find it is practicable to make a thoroughly efficient meter having less than half the temperature error of a meter of this kind having a pure-copper armature. To get the lowest temperature coefficient possible, I prefer to make the whole or a part of the stationary drag-circuit of this alloy also. I may accomplish this by making the amalgamated stationary ring 31 on the upper pole-piece 30 entirely of the low-coefficient alloy, or I may make it of pure copper and insert a short section 17 therein of an alloy having a very low, zero, or slightly negative coefficient. The section 17 I make with a comparatively high resistance, so as to concentrate in itself a considerable part of the total resistance, and thus effect an appreciable improvement in the temperature coefficient of the meter. In some cases I insert duplicate sections 17 in ring 31 diametrically opposite each other; but for reasons which will hereinafter more fully appear. I prefer to use only one of the sections 17. I may also make the small amalgamated plugs 7 and 8 of the low-temperature-coefficient alloy, and thus still further to a small extent reduce the meter's coefficient.

For obvious reasons it is desirable to have the pole-piece 30 as close to the periphery of the disk as possible, and when in this position the greatest concentration of the Foucault currents and the consequent resistance to the flow of the current is at the periphery of the disk, where the circuits diverge in passing out of the field. With a minimum gap between the poles of the magnet 1 the available conductivity of disk 4 for Foucault currents, and consequently the strength of the currents, may be materially increased by increasing the cross-section of the alloy or copper disk immediately outside of the magnetic field. For this purpose I provide the armature-disk 4 with a heavy rim 5, which rotates in a groove or channel 6 in the lower pole-piece 15.

Although I have been able to build meters of this type heretofore in which the friction of the mercury in the receptacle was practically negligible, there are difficulties which must be overcome in attaining this, and obviously it is desirable to provide means for compensating for this friction. I accomplish this by utilizing dissymmetrical or unbalanced stationary drag-circuits designed to have greater conductivity on one side of the magnetic field than on the other. I believe that the Foucault currents in these dissymmetrical return-paths, together with any portion of the main current which may be shunted through them, exert a demagnetizing effect on the magnet, and thus decrease both the torque of the meter-motor and the damping effect; but that since a greater decrease is made in the damping than in the torque the speed of the meter tends to increase, and thus compensates for the fluid friction of the mercury. The unbalancing of the return-path through the ring 31 is accomplished by inserting the section 17 of material of comparatively high resistance in one side only of the ring. The return-path through the disk 15 is unbalanced or dissymmetrical with respect to the magnetic field whenever the shutter 10 is at an intermediate position, since more of the plugs 8 are exposed on one side of the center about which they are grouped than on the other. I so construct the adjustable shutter 10 that when it is in an intermediate position the exposed plugs 8 are on the side required to give the proper compensation when the current is flowing in disk 4 in a definite direction. By properly distorting and proportioning these drag-circuits I am able to compensate fully for the friction of the mercury in the receptacle.

What I claim as new, and desire to secure by Letters Patent of the United States, is—

1. In an electric meter, a Foucault brake-disk composed of an alloy containing copper and chromium.

2. In an electric meter, a Foucault brake-disk composed of an alloy of copper, chromium and tungsten.

3. In an electric meter, a Foucault brake-disk composed of copper alloyed with chromium and tungsten in the proportion of about three of the former to one of the latter.

4. In an electric meter, a Foucault brake-disk, and a stationary return-path for Foucault current generated therein, said path being composed in part of an alloy having a low temperature coefficient.

5. In an electric meter, a mercury-receptacle, an armature mounted for rotation therein, a magnet having a pole-piece in proximity to the armature, and means for decreasing the resistance of a stationary return-path through said pole-piece for Foucault current generated in the armature.

6. In a meter, a mercury-receptacle, an armature therein, a magnet having a pole-piece in contact with the mercury whereby the pole-piece forms part of a return-path for Foucault current generated in the armature and means for decreasing the contact-resistance of the pole-piece.

7. In an electric meter, a mercury-receptacle, an armature mounted for rotation therein, a magnet having a pole-piece in proximity to the armature, and contacts of low-resistance material fixed to the pole-piece to afford a low-resistance return-path for Foucault currents through said pole-piece.

8. In a meter, a mercury-receptacle, an armature therein, a magnet having a pole-piece in proximity to the armature whereby the pole-piece forms part of a return-path for Foucault current generated in the armature and means for varying the speed of the meter by varying the conductivity of this path.

9. In an electric meter, a mercury-receptacle, an armature mounted for rotation therein, a magnet having a pole-piece in proximity to the armature, low-resistance contacts fixed to the pole-piece, and an adjustable shutter for cutting off more or less of said contacts.

10. An electric meter having a mercury-receptacle, a disk-armature having a rim which is thicker than the main body of the disk mounted for rotation in said receptacle in a bath of mercury, a magnet having pole-pieces in proximity to the thin portion of the disk and contacts entering said mercury-receptacle.

11. An electric meter having a mercury-receptacle, a disk-armature mounted for rotation therein in a bath of mercury, and a magnet having poles in proximity to the disk so that the flux of the magnet intersects it, said disk being enlarged in cross-section immediately outside the path of the flux.

12. In an electric meter a receptacle, an armature mounted for rotation therein in a bath of mercury, a magnet, and a stationary conductor constituting a return-path for Foucault current generated in said armature and arranged to compensate for the friction of the mercury.

13. In an electric meter, a mercury-receptacle, an armature therein, a magnet having a pole-piece in proximity to the armature, and an electric conductor about said pole-piece part of which is of material of greater resistance than the remainder.

14. In an electric meter, a mercury-receptacle, an armature therein, a magnet having a pole-piece in proximity to the armature and a stationary return-path for Foucault current generated in the armature dissymmetrical with respect to the magnet.

15. In an electric meter, a mercury-receptacle, an armature therein, a magnet having pole-pieces in proximity to the armature, a stationary return-path through one of said pole-pieces for Foucault current generated in the armature and means for shifting the center line of said path with respect to the magnetic flux.

In testimony that I claim the above I hereunto set my hand this 11th day of March, A. D. 1902.

EDWARD S. HALSEY.

Witnesses:
 CORA J. HAWKINS,
 CARL FORSTER.